US006851059B1

(12) United States Patent
Pfister et al.

(10) Patent No.: US 6,851,059 B1
(45) Date of Patent: Feb. 1, 2005

(54) METHOD AND SYSTEM FOR CHOOSING A QUEUE PROTECTION KEY THAT IS TAMPER-PROOF FROM AN APPLICATION

(75) Inventors: Gregory Francis Pfister, Austin, TX (US); Renato John Recio, Austin, TX (US); Danny Marvin Neal, Round Rock, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 09/692,353

(22) Filed: Oct. 19, 2000

(51) Int. Cl.[7] ............................................. H04L 9/00
(52) U.S. Cl. ................... 713/200; 713/152; 713/164; 713/189; 713/201; 380/280; 710/39; 710/40; 711/154
(58) Field of Search .......................... 380/280; 713/152, 713/164, 189, 200; 711/154; 710/39, 40

(56) References Cited

U.S. PATENT DOCUMENTS

| | | | | | |
|---|---|---|---|---|---|
| 4,104,721 A | * | 8/1978 | Markstein et al. | .......... | 711/164 |
| 4,809,160 A | * | 2/1989 | Mahon et al. | .............. | 713/200 |
| 6,052,785 A | * | 4/2000 | Lin et al. | ..................... | 713/201 |
| 6,374,357 B1 | * | 4/2002 | Mohammed et al. | ....... | 713/201 |
| 6,470,453 B1 | * | 10/2002 | Vilhuber | ..................... | 713/201 |
| 6,745,332 B1 | * | 6/2004 | Wong et al. | ................ | 713/201 |

* cited by examiner

*Primary Examiner*—Paul E. Callahan
(74) *Attorney, Agent, or Firm*—Mark E. McBurney; Dillon & Yudell LLP

(57) ABSTRACT

A method for enabling a Q_key that is tamper proof from applications on a distributed computer system to protect selected network operations is provided. Applications and an operating system (OS) execute on the end nodes and each may access various network resources. In the invention, the network resources are configured for selective access by particular applications or OS.

In a preferred embodiment, a control bit of a Q_key, which allows applications to authenticate their use of particular communication resources, i.e., the send and receive queues, is reserved and utilized to signal whether a particular application is allowed access to the resources. Setting the control bit to 0 allows the Q_key to be set by an application directly. When the control bit is set to 1, the Q_key cannot be set by an application and can only be set using a privileged operation performed only by the OS.

22 Claims, 7 Drawing Sheets

METHOD AND SYSTEM FOR CHOOSING A QUEUE PROTECTION KEY THAT IS TAMPER-PROOF FROM AN APPLICATION

The present invention is related to the subject matter of the following commonly assigned, co-pending United States Patent Applications filed concurrently herewith: Ser. No. 09/692,342 entitled "Method and System for Informing An Operating System In A System Area Network When A New Device Is Connected"; Ser. No. 09/692,350 entitled "Efficient Process for Handover Between Subnet Managers"; Ser. No. 09/692,347 entitled "Method and System For Scalably Selecting Unique Transaction Identifiers". Ser. No. 09/642,349 entitled "Method And System For Reliably Defining and Determining Timeout Values In Unreliable Datagrams". The content of the above-referenced applications is incorporated herein by reference.

BACKGROUND OF THE INVENTION

1. Technical Field

The present invention relates in general to computer networks and, in particular, to communications between nodes on a computer network. Still more particularly, the present invention relates to a method and system for protecting restricted operations on a System Area Network from being accessed by an application running on the network.

2. Description of the Related Art

Distributed computer networks are known in the art. In a traditional network, individual components of the network are interconnected via a parallel bus, such as a PCIX bus. The parallel bus has a relatively small number of plug-in ports for connecting the components. The number of plug-in-ports is set (i.e., it cannot be increased). At maximum loading, a PCIX bus transmits data at about 1 Gbyte/second. Traditional networks provide access to remote services and/or components. In addition, the network often includes access restriction mechanisms (e.g., passwords) to protect some components or operations from being accessed or manipulated by unauthorized users/processes.

The introduction of high performance adapters (e.g., SCSI adapters), Internet-based networks, and other high performance network components has resulted in increased demand for bandwidth, faster network connections, distributed processing functionality, and scaling with processor performance. These and other demands are quickly outpacing the current parallel bus technology and are making the limitations of parallel buses even more visible. PCIX bus, for example, is not scalable, i.e., the length of the bus and number of slots available at a given frequency cannot be expanded to meet the needs for more components, and the limitation hinders further development of fast, efficient distributed networks, such as system area networks. New switched network topologies and systems are required to keep up with the increasing demands, while providing the access security features of the parallel bus design.

The present invention recognizes the need for faster, more efficient computer networks offering the features demanded by the developments of technology. More specifically, the present invention recognizes the need for providing a method and system within a system area network to protect and/or limit access to specific operations or resources on the network by an application running on the network.

SUMMARY OF THE INVENTION

A method for enabling a Q_key that is tamper proof from applications on a distributed computer system to protect selected network operations is provided. The invention is applicable to a distributed computing system, such as a system area network, having end nodes, switches, and routers, and links interconnecting these components. The switches and routers interconnect the end nodes and route packets from a source end node to a target end node. Applications and an operating system (OS) execute on the end nodes and each may access various network processes. In the invention, the network processes are configured for selective access by particular applications or OS.

In a preferred embodiment, a high-order bit of a Q_key, which allows applications to authenticate their use of particular communication resources (i.e., the send and receive queues) is reserved. The high-order bit is utilized to signal whether a particular application should be granted access to the resources. In one embodiment, setting the bit to 0 allows the Q_key to be set by an application directly. When the bit is set to 1, the Q_key cannot be set by an application and the Q_key can only be set using a privileged operation that is performed only by the OS. By using this method, the OS has control over both the set of controlled keys and the processes that have access to these keys.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a method and system for protecting restricted network resources of a distributed computer system, such as a system area network (SAN), from access and manipulation by unprivileged application process running on the network. The invention provides an advanced keying mechanism by which an operating system (OS) is allowed to change access rights to the network process/ operation while specific applications are prevented from changing the access rights.

In order to appreciate the environment within which the invention is preferably practiced, a description of a SAN configured with routers, switches, and end nodes, etc. is provided below. Presentation of the environment and particular functional aspects of the environment which enable the invention to be practiced are provided with reference to FIGS. 1–5. Section headings have been provided to distinguish the hardware and software architecture of the SAN. However, those skilled in the art understand that the descriptions of either architecture necessarily includes references to both components.

SAN Hardware Architecture

Figure 1:
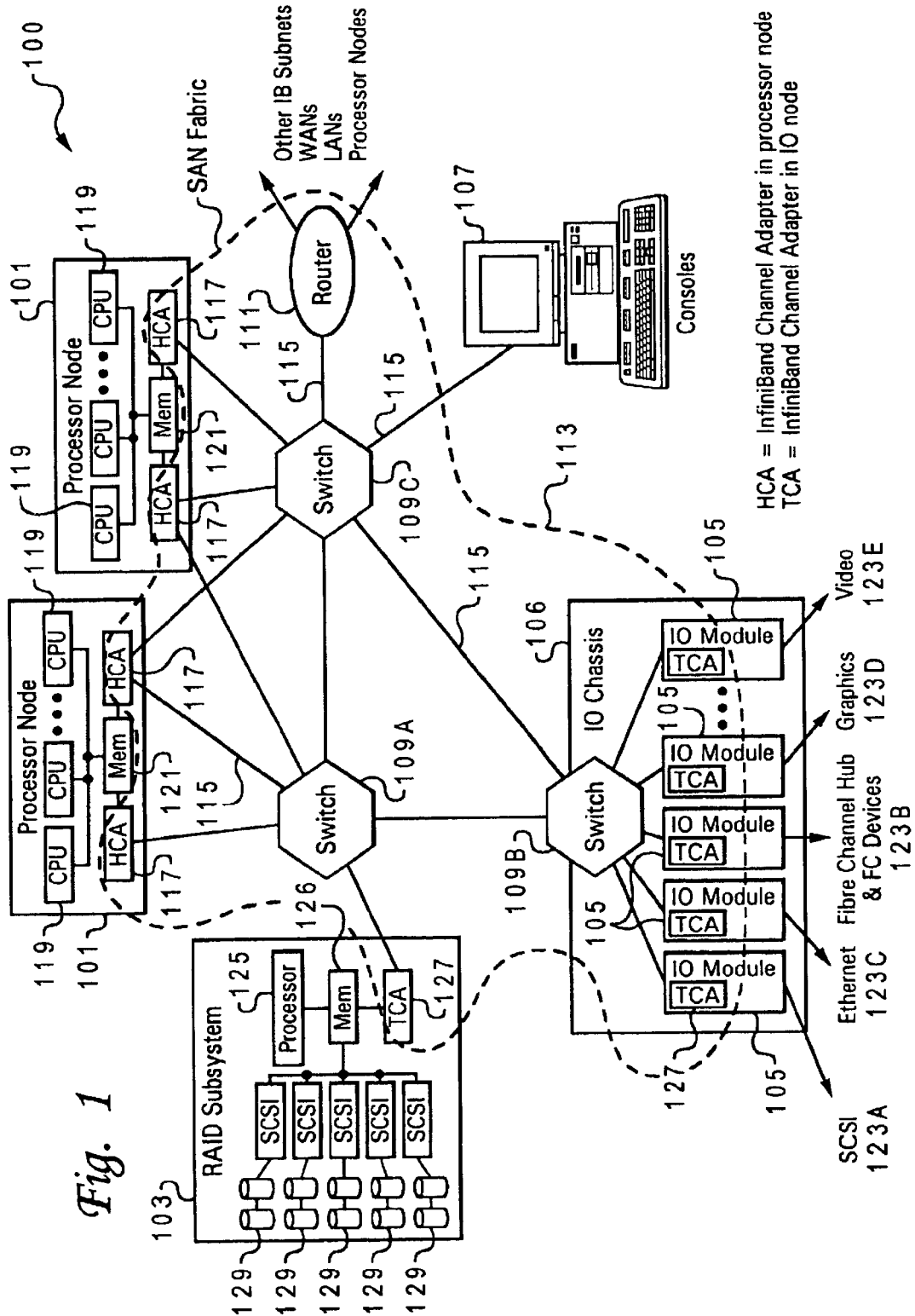
FIG. 1 depicts a system area network (SAN) in which the present invention is preferably implemented.

With reference now to the figures and in particular with reference to FIG. 1, there is illustrated an exemplary embodiment of a distributed computer system. Distributed computer system 100 represented in FIG. 1 is provided merely for illustrative purposes, and the embodiments of the present invention described below can be implemented on computer systems of numerous other types and configurations. For example, computer systems implementing the present invention may range from a small server with one processor and a few input/output (I/O) adapters to very large parallel supercomputer systems with hundreds or thousands of processors and thousands of I/O adapters. Furthermore, the present invention can be implemented in an infrastructure of remote computer systems connected by an Internet or intranet.

As shown in FIG. 1, distributed computer system 100 includes a system area network (SAN) 113, which is a high-bandwidth, low-latency network interconnecting nodes within the distributed computer system. More than one (1) SAN 113 may be included in a distributed computer system 100 and each SAN 113 may comprise multiple sub-networks (subnets).

A node is herein defined to be any component that is attached to one or more links of a network. In the illustrated distributed computer system, nodes include host processors 101, redundant array of independent disks (RAID) subsystem 103, I/O adapters 105, switches 109A–109C, and router 111. The nodes illustrated in FIG. 1 are for illustrative purposes only, as SAN 113 can connect any number and any type of independent nodes. Any one of the nodes can function as an end node, which is herein defined to be a device that originates or finally consumes messages or frames in the distributed computer system 100.

SAN 113 is the communications and management infrastructure supporting both I/O and inter-processor communications (IPC) within distributed computer system 100. Distributed computer system 100, illustrated in FIG. 1, includes a switched communications fabric (i.e., links, switches and routers) allowing many devices to concurrently transfer data with high-bandwidth and low latency in a secure, remotely managed environment. End nodes can communicate over multiple ports and utilize multiple paths through SAN 113. The availability of multiple ports and paths through SAN 113 can be employed for fault tolerance and increased-bandwidth data transfers.

SAN 113 includes switches 109A–109C and routers 111. Switch 109A–109C connects multiple links together and allows routing of packets from one link to another link within SAN 113 using a small header Destination Local Identifier (DLID) field. Router 111 is capable of routing frames from one link in a first subnet to another link in a second subnet using a large header Destination Globally Unique Identifier (DGUID). Router 111 may be coupled via wide area network (WAN) and/or local area network (LAN) connections to other hosts or other routers.

In SAN 113, host processor nodes 101 and I/O nodes 106 include at least one Channel Adapter (CA) to interface to SAN 113. Host processor nodes 101 include central processing units (CPUs) 119 and memory 121. In one embodiment, each CA is an endpoint that implements the CA interface in sufficient detail to source or sink packets transmitted on SAN 113. As illustrated, there are two CA types, Host CA (HCA) 117 and Target CA (TCA) 127. HCA 117 is used by general purpose computing nodes to access SAN 113. In one implementation, HCA 117 is implemented in hardware. In the hardware implementation of HCA 117, HCA hardware offloads much of CPU and I/O adapter communication overhead. The hardware implementation of HCA 117 also permits multiple concurrent communications over a switched network without the traditional overhead associated with communicating protocols. Use of HCAs 117 in SAN 113 also provides the I/O and IPC consumers of distributed computer system 100 with zero processor-copy data transfers without involving the operating system kernel process. HCA 117 and other hardware of SAN 113 provide reliable, fault tolerant communications.

The I/O chassis 106 includes I/O adapter backplane and multiple I/O adapter nodes 105 that contain adapter cards. Exemplary adapter cards illustrated in FIG. 1 include SCSI adapter card 123A, adapter card 123B to fiber channel hub and FC-AL devices, Ethernet adapter card 123C, graphics adapter card 123D, and video adapter card 123E. Any known type of adapter card can be implemented. The I/O chassis 106 also includes switch 109B in the I/O adapter backplane to couple adapter cards 123A–123E to SAN 113.

RAID subsystem 103 includes a microprocessor 125, memory 126, a Target Channel Adapter (TCA) 127, and multiple redundant and/or striped storage disks 129.

In the illustrated SAN 113, each link 115 is a full duplex channel between any two network elements, such as end nodes, switches 109A–109C, or routers 111. Suitable links 115 may include, but are not limited to, copper cables, optical cables, and printed circuit copper traces on backplanes and printed circuit boards. The combination of links 115 and switches 109A–109C, etc. operate to provide point-to-point communication between nodes of SAN 113.

SAN Software Architecture

Software Components

Figure 2:
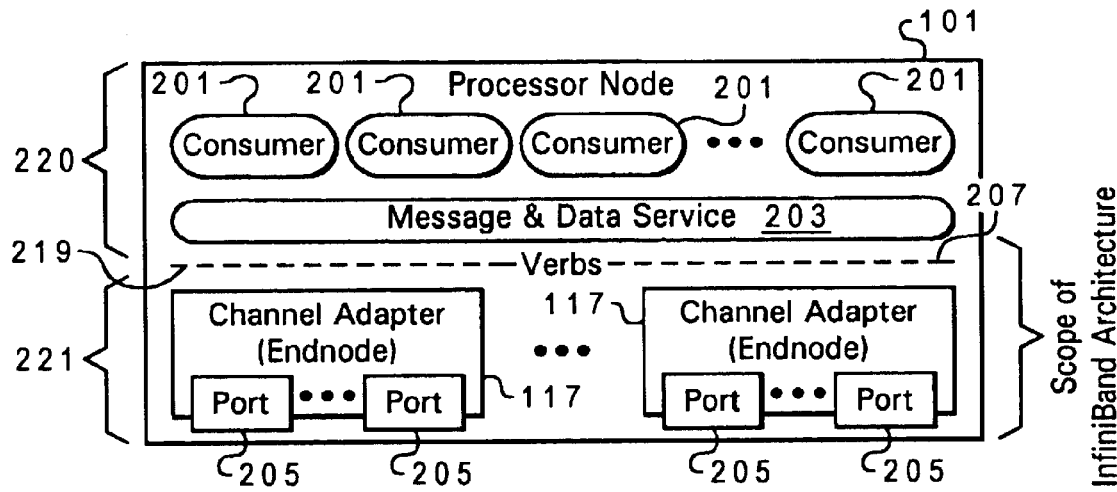
FIG. 2 is a diagram of software aspects of an exemplary host processor end node for the SAN of FIG. 1 in accordance with the present invention.

Software and hardware aspects of an exemplary host processor node 101 are generally illustrated in FIG. 2. Host processor node 101 includes one or more processors that execute a set of consumer processes 201. Host processor node 101 includes HCA 117 with ports 205. Each port 205 connects to a link 115 of SAN 113. Ports 205 can connect to one SAN subnet or multiple SAN subnets. Utilizing message and data services 203, consumer processes 201 transfer messages to SAN 113 via verbs interface 207. Verbs interface 207 is generally implemented with an operating-system specific programming interface.

Figure 3:
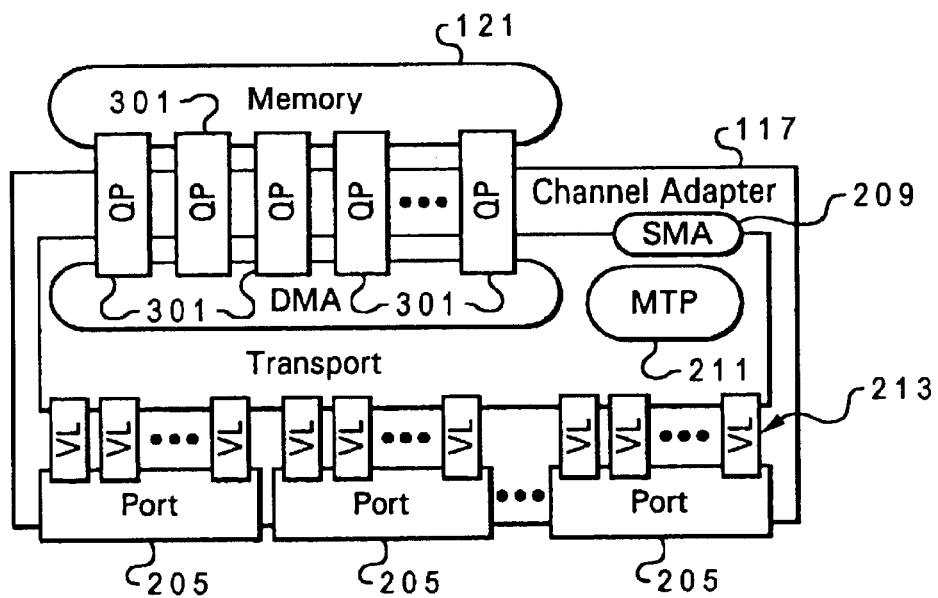
FIG. 3 is a diagram of an example host channel adapter of the SAN of FIG. 1 in accordance with the present invention.

A software model of HCA 117 is illustrated in FIG. 3. HCA 117 includes a set of queue pairs (QPs) 301, which transfer messages across ports 205 to the subnet. single HCA 117 may support thousands of QPs 301. By contrast, TCA 127 in an I/O adapter typically supports a much smaller number of QPs 301. Also illustrated are subnet management administration (SMA)209, management packets 211 and a number of virtual lanes 213, which connect transport layer with ports 205.

Figure 5:
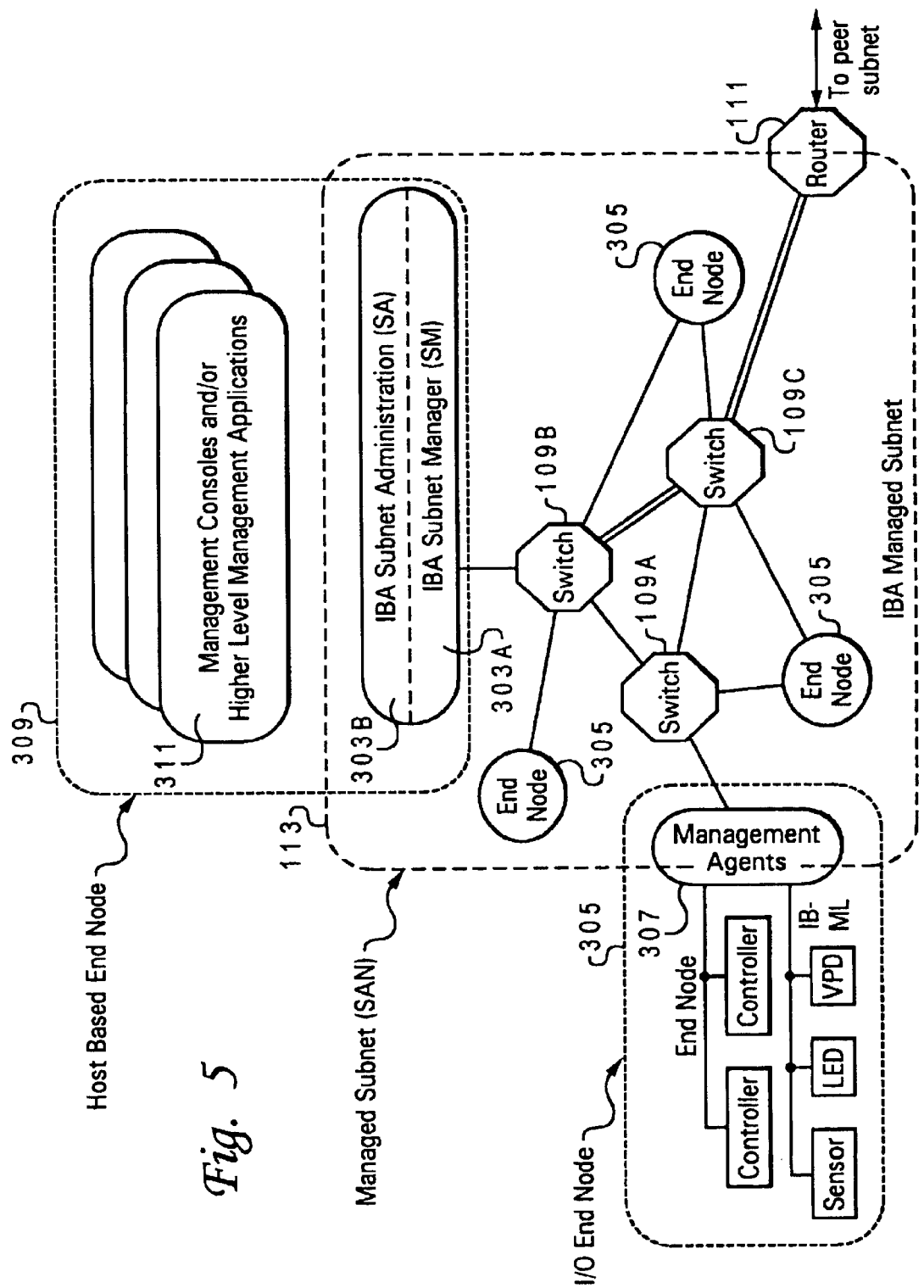
FIG. 5 is a diagram of the software aspects of SAN management model in accordance with the present invention.

Turning now to FIG. 5, there is illustrated a software management model for nodes on SAN 113. SAN architecture management facilities provides a Subnet Manager (SM) 303A, a Subnet Administration (SA) 303B, and an infrastructure that supports a number of general management services. The management infrastructure includes a Subnet Management Agent (SMA) 307 operating in each node and defines a general service interface that allows additional general services agents. Also, SAN architecture defines a common management datagram (MAD) message structure for communicating between managers and management agents.

SM 303A is responsible for initializing, configuring and managing switches, routers, and channel adapters. The SM can be implemented within other devices, such as a channel adapter or a switch. One SM 303A of SAN is dedicated as a master SM and is responsible for: discovering the subnet topology; configuring each channel adapter port with a range of Local Identification (LID) numbers, Global Identification (GID) number, subnet prefix, and Partition Keys (P_Keys); configuring each switch with a LID, the subnet prefix, and with its forwarding database; and maintaining the end node and service databases for the subnet to provide a Global Unique Identification (GUID) number to LID/GID resolution service as well as a services directory. Thus, management of SAN 113 and SAN components, such as HCAs 117, TCAs (or end nodes) 127, switches 109, and routers 111 are completed utilizing Subnet Management (SM) 303A and Subnet Administration (SA) 303B. SMPs are used to discover, initialize, configure, and maintain SAN components through management agents 307 of end nodes 305. SAN SA packets are used by SAN components to query and update subnet management data. Control of some aspects of the subnet management are provided via a user management console 311 in host-based end node 309.

Message Transfer Process

SAN 113 provides the high-bandwidth and scalability required for I/O and also supports the extremely low latency and low CPU overhead required for Interprocessor Communications (IPC). User processes can bypass the operating system (OS) kernel process and directly access network communication hardware, such as HCAs 117, which enable efficient message passing protocols. SAN 113 is suited to current computing models and is a building block for new forms of I/O and computer cluster communication. SAN 113 allows I/O adapter nodes 105 to communicate among themselves or communicate with any or all of the processor nodes 101 in the distributed computer system. With an I/O adapter attached to SAN 113, the resulting I/O adapter node 105 has substantially the same communication capability as any processor node 101 in the distributed computer system.

For reliable service types of messages, end nodes, such as host processor nodes 101 and I/O adapter nodes 105, generate request packets and receive acknowledgment packets. Switches 109A–109C and routers 111 pass packets along from the source to the target (or destination). Except for the variant CRC trailer field, which is updated at each transfer stage in the network, switches 109A–109C pass the packets along unmodified. Routers 111 update the variant CRC trailer field and modify other fields in the header as the packet is routed.

In SAN 113, the hardware provides a message passing mechanism that can be used for Input/Output (I/O) devices and Interprocess Communications (IPC) between general computing nodes. Consumers (i.e., processing devices connected to end nodes) access SAN 113 message passing hardware by posting send/receive messages to send/receive work queues (WQ), respectively, on a SAN Channel Adapter (CA).

A message is herein defined to be an application-defined unit of data exchange, which is a primitive unit of communication between cooperating processes. A packet (or frame) is herein defined to be one unit of data encapsulated by networking protocol headers (and trailer). The headers generally provide control and routing information for directing the packet (or frame) through SAN 113. The trailer generally contains control and cyclic redundancy check (CRC) data for ensuring that frames are not delivered with corrupted content.

Consumers use SAN verbs to access HCA functions. The software that interprets verbs and directly accesses the CA is known as the Channel Interface (CI) 219. Send/Receive work queues (WQ) are assigned to a consumer as a Queue Pair (QP). Messages may be sent over five different transport types, Reliable Connected (RC), Reliable Datagram (RD), Unreliable Connected (UC), Unreliable Datagram (UD), and Raw Datagram (RawD). Consumers retrieve the results of these messages from a Completion Queue (CQ) through SAN send and receive work completions (WC). The source CA takes care of segmenting outbound messages and sending them to the destination. The destination or target CA takes care of reassembling inbound messages and placing them in the memory space designated by the destination's consumer. These features are illustrated in the figures below.

Figure 4:
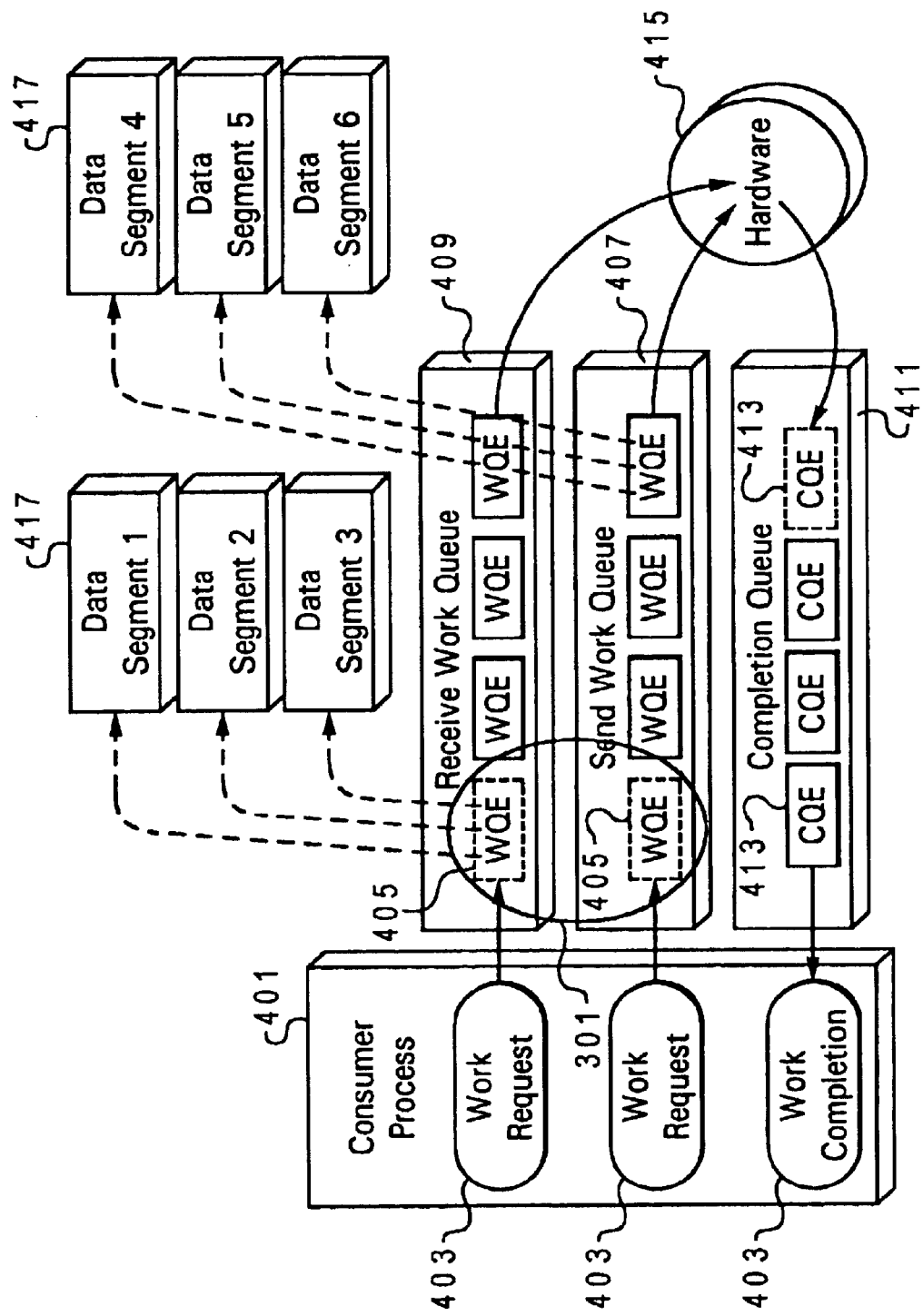
FIG. 4 is a diagram of the work queue and completion queue process for the queue pairs (QPs) of FIG. 3.

Referring now to FIG. 4, there is illustrated a block diagram of work and completion queue processing. Each QP 301 provides an input to a Send Work Queue (SWQ) 407 and a Receive Work Queue (RWQ) 409. SWQ 407 sends channel and memory semantic messages, and RWQ 409 receives channel semantic messages. A consumer calls a verb (within verbs interface 207) to place Work Requests (WRs) into a WQ. A Send WR 403 is a channel semantic operation to push a set of local data segments 417 to the data segments referenced by a remote node's Receive WQE 405. Each of the Send WR's data segments 417 contains a virtually contiguous memory region. The virtual addresses used to reference the local data segments 417 are in the address context of the process that created the local QP 301.

As shown in FIG. 4, WRs 403 that have been placed onto a WQ by consumer process 401 are referred to as work queue elements (WQEs) 405. WQEs 405 are executed by hardware 415 in HCA 117. SWQ 407 contains WQEs 405 that describe data to be transmitted on the SAN fabric. RWQ 409 contains WQEs 405 that describe where to place incoming channel semantic data received from SAN 113.

In one embodiment, Receive Work Queues 409 only support one type of WQE 405, which is referred to as a receive WQE. The receive WQE provides a channel semantic operation describing a local memory space into which incoming send messages are written. The receive WQE includes a scatter list describing several virtually contiguous memory spaces. An incoming send message is written to these memory spaces. The virtual addresses are in the address contexts of the process that created the local QP 301.

Verbs interface 207 also provide a mechanism for retrieving completed work from completion queue 411. Completion queue 411 contains Completion Queue Elements (CQEs) 413 which 413 contain information about previously completed WQEs 405. Completion queues 413 are employed to create a single point of completion notification for multiple QPs 301. CQE 413 contains sufficient information to determine the QP 301 and specific WQE 405 that completed. A completion queue context (not shown) is a block of information that contains pointers to, length, and other information needed to manage individual completion queues 411.

Remote Operation Functionality

SAN 113, with its interlinked arrangement of components and sub-components, provides a method for completing remote operations, by which processor nodes may directly control processes in I/O nodes. Remote operation also permits the network to manage itself. A remote direct memory access (RDMA) Read WR provides a memory semantic operation to read a virtually contiguous memory space on a remote node. A memory space can either be a portion of a memory region or a portion of a memory window. A memory region references a previously registered set of virtually contiguous memory addresses defined by a virtual address and length. A memory window references a set of virtually contiguous memory addresses which have been bound to a previously registered region.

The RDMA Read WR writes the data to a virtually contiguous local memory space. Similar to Send WR 403, virtual addresses used by the RDMA Read WQE to reference the local data segments are in the address context of the process that created the local QP 301. The remote virtual addresses are in the address context of the process owning the remote QP targeted by the RDMA Read WQE.

RDMA Write WQE provides a memory semantic operation to write a virtually contiguous memory space on a remote node. RDMA Write WQE contains a scatter list of local virtually contiguous memory spaces and the virtual address of the remote memory space into which the data from the local memory spaces is written.

RDMA FetchOp WQE provides a memory semantic operation to perform an atomic operation on a remote word. RDMA FetchOp WQE is a combined RDMA Read, Modify, and Write operation. RDMA FetchOp WQE can support several read-modify-write operations, such as "Compare and Swap if Equal."

A Bind (unbind) remote access key (R_Key) WQE provides a command to the HCA hardware to modify a memory window by associating the memory window to a memory region. A second command to destroy a memory window by disassociating the memory window to a memory region is also provided. The R_Key is part of each RDMA access and is used to validate that the remote process has permitted access to the buffer.

Managing Network Resource Access via a Q_Key that Is Tamperproof from Unauthorized Application Processes Utilization of the hardware, firmware, and software context in SAN 113 configuration requires a mechanism to ensure that restricted access resources are protected from access by unauthorized applications running on SAN 113. SAN network is provided with a Q_Key that allows applications to authenticate their use of particular communication resources, i.e., the send and receive queues. The operating system (OS) typically controls access rights but with SAN applications utilizing verbs without necessarily accessing an OS. To facilitate the use of the resources the Q_keys are typically setable by the applications. In some instances, an application or user desires to restrict access to the particular resource so that the resource is not available to some or all of the applications. The invention provides a mechanism to prevent unauthorized access across the network by implementing a stronger authentication feature that prevents the applications from being able to bypass the authentication process and access restricted resources.

Queues that are shared among processes using datagram type messages across the SAN fabric require protection keys to validate the requester's right to use the received queue at the receiving end. One of the protection keys utilized within SAN 113 is called the Queue Key (Q_Key). The Q_key mechanism allows applications to authenticate their right to utilize particular communication resources, such as send and receive queues. In order to facilitate the authentication by the applications (i.e., use of the received queue), the Q_keys are typically able to be set by the application. Because of the ability of the application to set the Q_key, there is a need for stronger authentication that cannot be forged by an application not authorized to access the communication resources.

In SAN 113, the OS runs as a privileged class program, and applications run as an unprivileged class. The applications request the OS to perform certain operations that are privileged, for example the QP context setup. The preferred embodiment of the present invention provides a Q_key that is OS controllable and which prevents access to a queue resource from an application process level without validation that the application has authority to use the queue resource. In one embodiment, unauthorized access is controlled by utilizing keys that are large enough to make guessing of the correct key by the application process very difficult. The preferred embodiment, however, provides a Q_key that is tamper-proof from an application process level. The "controlled Q_keys" are generated for the queues but cannot be manipulated from the application process level unless the operating system (OS) gives the application the authority to do so.

Figures 8, 9:
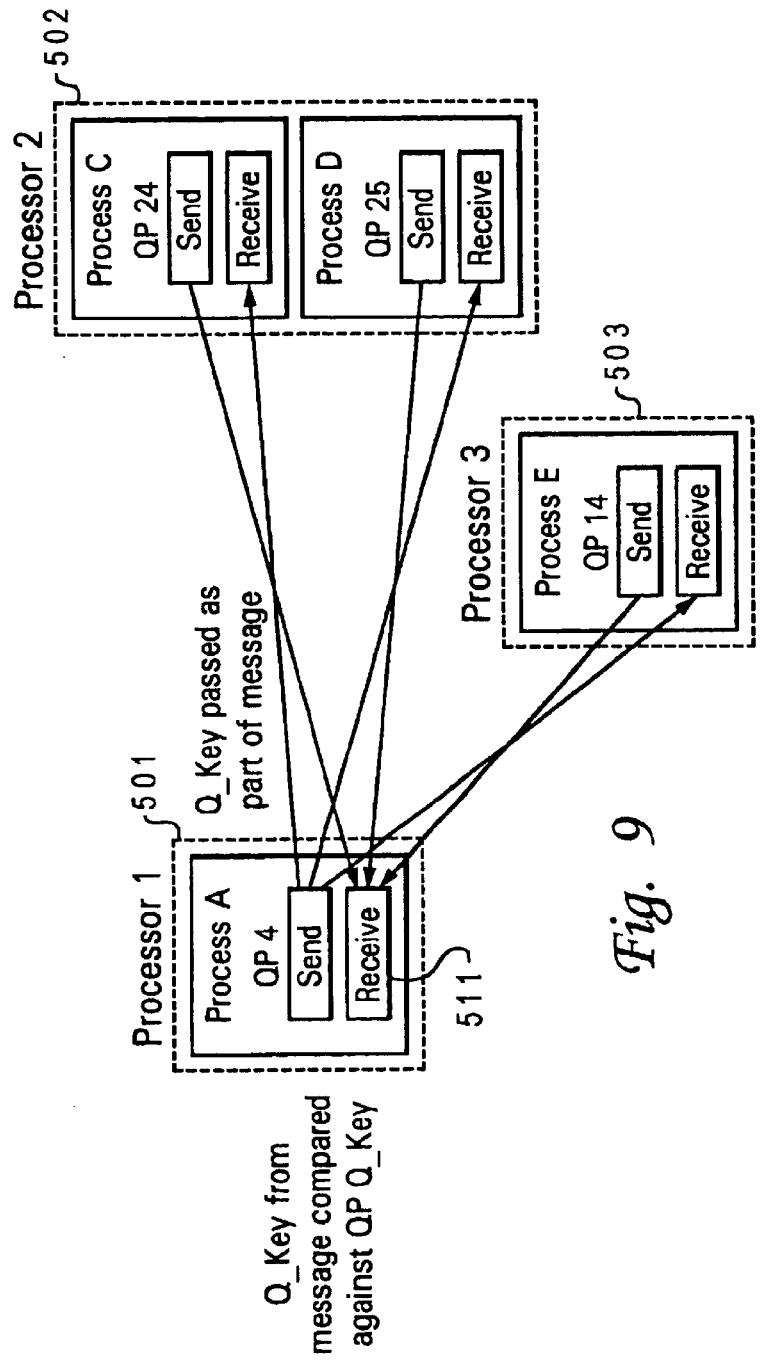
FIG. 8 illustrates an exemplary controlled Q_key in accordance with one embodiment of the invention.
FIG. 9 is a diagram of the send and receive queue communication model for Datagram type communications according to one embodiment of the invention.

Referring now to FIG. 9, a three processor datagram communication service is illustrated. The three processors, processors 1 501, processors 2 502 and processors 3 503 communicate with each other via Send/Receive (QP) messages of various processes. Four such processes are illustrated including, for example, Process C and Process D on processor 2 502 and Process E on processor 3 503. During operation, the remote processes may simultaneously attempt to communicate with Process A though the use of datagram type messages. Datagram type messages comprise a characteristic that allows sharing of QPs at the end nodes.

As illustrated in FIG. 9, Processes C, D, and E are attempting to communicate with QP_4 of process A. Each datagram message contains a Q_Key as part of the message. The Q_key is compared against the Q_Key that is associated with QP_4. If there is a match, the request is placed into the Receive Queue 511 of QP_4, otherwise it is either silently dropped (e.g., as in the case of Unreliable Datagram type service) or a negative acknowledgment (NAK) type message is sent back to the sender (e.g., as in the case of Reliable Datagram type service). Typically, application processes requesting access to a QP may guess at the Q_key a number of times until the correct Q_key is guessed. To prevent one or more of Processes C, D, or E from gaining unauthorized access to QP_4, a Q_key is needed that is can not be guessed by the excluded processes. The present invention prevents possibly successful attempts by one or more of the processes C, D, or E of guessing the Q_Key correctly by providing a Q_key that cannot be generated by the requesting process.

In one embodiment of the invention, an additional bit is provided in the Q_key and designated a privilege bit (or control bit). The additional bit enhances the Q_key functionality by allowing application level access restrictions to be set for the Q_key. FIG. 8 illustrates a Q_key 801 (e.g. a sequence of characters) with control bit 803. Thus, during SAN operation, application level code is prohibited from generating a Q_key on a Send Work Request or a Modify QP request unless the HCA code, which is trusted, first identifies the application as having authority to use a controlled Q_Key.

In the preferred embodiment, a controlled Q_Key is a Q_Key with an additional bit or dedicated highest order bit that is reserved for the OS (i.e., the value may be changed only by the OS). Accordingly, the invention creates two classes of Q_Keys, the controlled class and the uncontrolled class. The control bit is set to 1 for the controlled class, and to 0 for the uncontrolled class. The process of generating a controlled class key is described below with reference to FIGS. 6A and 6B.

Figure 6A:
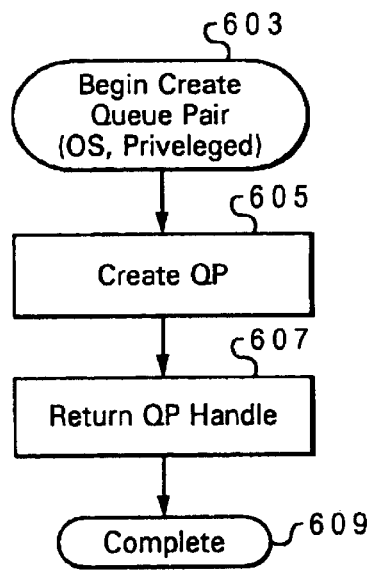
FIG. 6A is a flow chart of the Queue Pair setup process in accordance with a preferred embodiment of the FIG. 6B is a flow chart of the controlled Q_Key setup process in accordance with a preferred embodiment of the invention.

Referring now to FIG. 6A, the process of setting up a QP including a Q_key handle is illustrated. The QP context is created as an OS privileged operation, at block 603, and following, the QP is created at block 605. The QP context includes information, such as a Q_key, generated during set up of the QP, which relates to the QP and is sent along with the QP during communication on SAN 113. Returning to FIG. 6A, the handle of the QP is returned at block 607, and the create process ends at block 609. The QP handle is a value that is used by the process (e.g., a modify QP or send WR) to reference the QP that was just created.

Figure 6B:
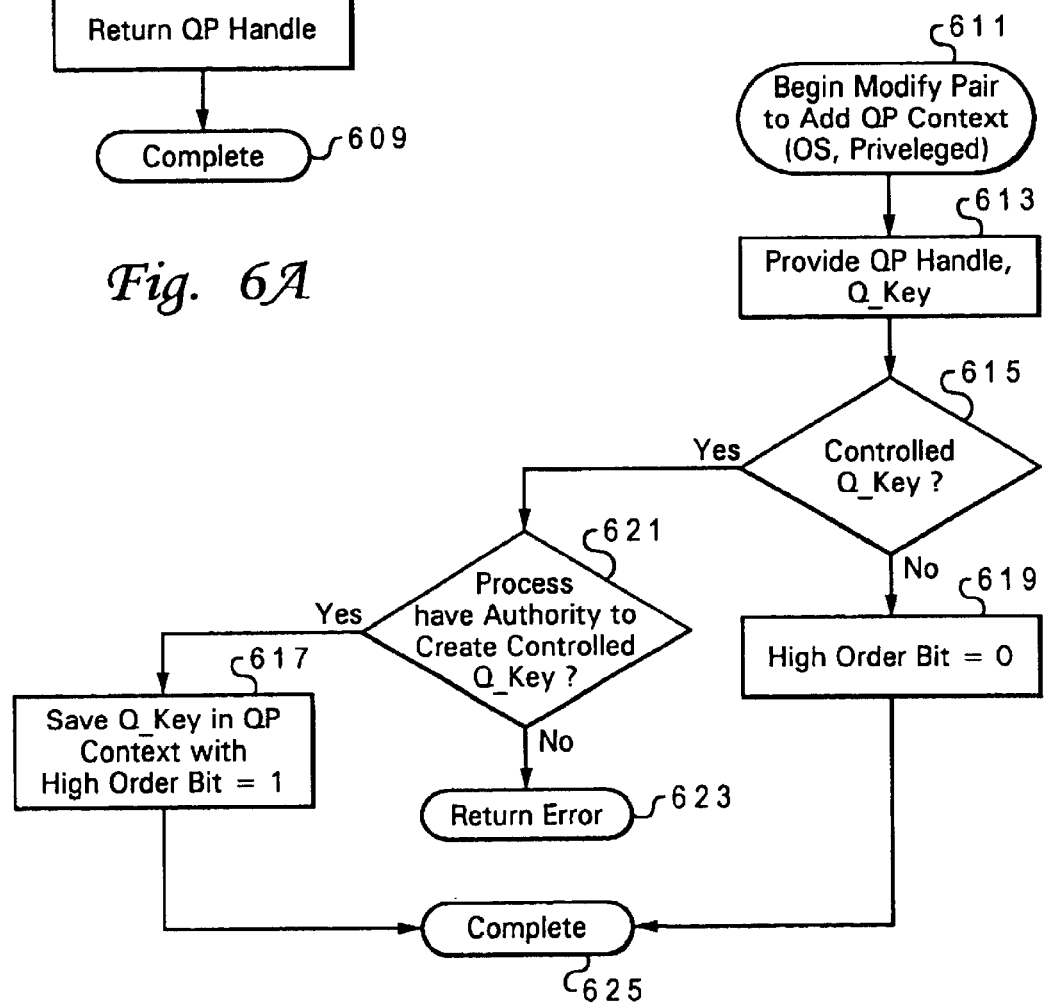

FIG. 6B illustrates an exemplary embodiment of the setting of a controlled Q_Key. Following the QP creation process of FIG. 6A, a modify operation is performed at block 611 to set up the Q_key and add the Q_Key to the QP context. The requester provides the QP handle that was generated in block 613. A determination is made at block 615, whether the Q_Key is to be a controlled Q_Key. If the Q_Key is to be a controlled Q_Key, then a test is completed at block 621 to see if the process has authority to modify the Q_Key. Note, in the preferred embodiment, only the OS has authority to modify a Q_Key. If the process has the authority, then the Q_Key is saved in the QP context with the high order bit set to a 1 at block 617. Then the process ends at block 625.

Returning to block 621, if the process does not have the authority to modify the Q_Key in the QP context to a controlled Q_Key, then an error is returned to the requester at block 623. Returning to block 615, if the Q_Key is not to be a controlled Q_Key, the Q_Key in the QP context is used as-is from the requester with the high order bit set to a 0 at block 619. Then, the process ends at block 625. The setting of the high order bit in both scenarios is completed by the OS.

Figure 7:
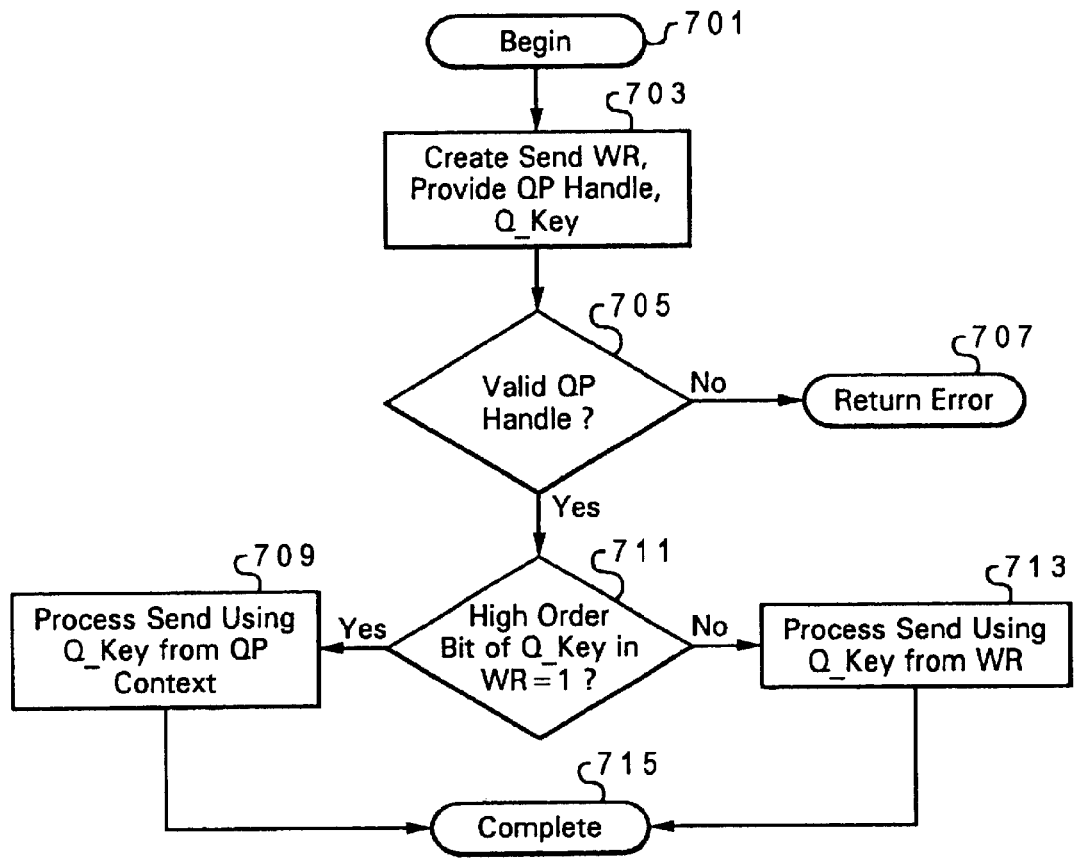
FIG. 7 is a flow chart of the Send Work Request processing in accordance with the invention.

Referring now to FIG. 7, the process of utilizing the Q_Key facility is illustrated. The process begins at block 701 and then proceeds to block 703, where an application creates a Send WR. The application specifies the Q_Key that it wants to send along with the request and creates the request. A determination is made at block 705, whether the requester has a valid QP handle to access the QP. If the QP handle is not valid for the requested QP, then an error is returned at block 707. If, however, the QP handle is valid, then a determination is made at block 711, whether the high order bit of the Q_key is set to a 1. If the high order bit of the Q_Key requested in the Send WR is a 1, then the Q_Key from the previously set up QP context is used to process the send WR at block 709. Otherwise, the Q_Key from the Send WR is used at block 713, thus allowing the application to create a different Q_Key to be issued with the send WR. Then the process ends at block 715.

Because the OS controls access to and modification of the controlled Q_Key, only the controlled Q_Key from the context setup may be utilized by the application when issuing the send WR to the network. Therefore, the OS restricts the application's ability to guess a Q_Key for the privileged operations on the network.

Thus, since the application cannot generate a controlled Q_Key on its own, security of controlled Q_Keys is maintained by the OS. In operation an appropriately authorized application is able to direct the OS to set the control bit to 1, thus preventing other applications from accessing and manipulating the Q_key. Several different mechanism may be utilized to allow the OS to allocate Q_Keys with the higher order control bit and ensure the subsequent use of resources only by those applications that should use them. For example, a software enabled Q_key control access utility may be provided within OS.

As a final matter, it is important to note that while an illustrative embodiment of the present invention been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

In the above detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. For example, although the invention provides an authentication mechanism for a Q_key, the invention finds applicability with other keys (e.g., partition key) utilized by SAN 113. The above detailed description, therefore, is not to be taken in a limiting sense, and the scope of the present invention is defined by the appended claims.

What is claimed is:

1. A method for protecting resources of a network from unauthorized access, said method comprising the steps of:

generating a Q_Key for a resource at a node of said network;

setting a control bit of said Q_Key to a value that represents a level of access to external resources, which is granted to a requesting application, wherein said value may be a first value or a second value and is set by an operating system on said network; and controlling access to said external resources by said requesting application utilizing said Q_Key.

2. The method of claim 1, further comprising the steps of:

determining a desired level of access to said external resources; and when a restricted level of access is desired, setting said control bit to said second value utilizing said operating system.

3. The method of claim 2, further comprising the steps of:

determining that said control bit is set to said first value during generation of a request by said requesting application; and in response to said determining step, issuing said request to said network utilizing a request Q_Key generated by said request.

4. The method of claim 2, wherein said setting of said control bit is completed during a context setup for said resource, said method further comprising the steps of:

determining that said control bit is set to said second value during generation of a request by said requesting application; and in response to said determining step, issuing said request utilizing only a Q_Key created during said context setup.

5. The method of claim 4, further comprising the step of preventing a non-privileged operation from modifying said Q_Key when said control bit is set to said second value, wherein a privileged operation includes an operation by said an operating system (OS) and an operation by a pre-determined set of processes.

6. The method of claim 1, wherein said generating step includes the step of appending said control bit to a Q_key of said application process context.

7. The method of claim 1, further comprising the step of issuing said Q_Key along with a request of said requesting application out to said network.

8. The method of claim 7, further comprising the steps of:

comparing said Q_key with a resource Q_key of one of said resources; and when said Q_Key matches said resource Q_Key, providing said requesting application with access to said one resource.

9. A network comprising:

a first node and a second node;

at least one switch connecting said first node to said second node;

an operating system (OS) running on a processor connected to said first node;

a resource management utility including a queue key utility that provides a controlled queue key (Q_Key) by which access to a network resource by an application is controlled.

10. The network of claim 9, wherein said Q_Key utility creates said controlled Q_Key during a setup context of a resource on said first node and includes a control bit in said controlled Q_Key that may be a first value or a second value, wherein said Q_Key may only be set by said operating system and a set of pre-determined processes when said control bit is said second value.

11. The network of claim 10, further comprising:

a requesting application that provides a request for access to said network resources, wherein said request includes a application generated Q_Key;

means for determining that said control bit is set to said second value; and means, responsive to said determining means, for only issuing said request to said network with said controlled Q_Key.

12. The network of claim 11, wherein when said control bit is set to said second value, said controlled Q_Key may be modified by said requesting application when said application process is one of said set of pre-determined processes.

13. The network of claim 12, further comprising:

means for determining that said control bit is set to said first value; and means, responsive to said determining means, for issuing said request to said network with said application generated Q_Key.

14. The network of claim 9, further comprising:

resource access utility for comparing a controlled queue key of said network resource with a Q_Key issued along with said request, wherein, when said Q_Key matches said controlled Q_Key, providing said request with access to said network resource.

15. A computer program product comprising:

a computer readable medium; and program instructions on said computer readable medium for:

generating a Q_Key for a resource at a node of said network;

setting a control bit of said Q_Key to a value that represents a level of access to external resources, which is granted to a requesting application, wherein said value may be a first value or a second value and is set by an operating system on said network; and controlling access to said external resources by said requesting application utilizing said Q_Key.

16. The computer program product of claim 15, further comprising program instructions for:

determining a desired level of access to said external resources; and when a restricted level of access is desired, setting said control bit to said second value utilizing said operating system.

17. The computer program product of claim 16, further including program instructions for:

determining that said control bit is set to said first value during generation of a request by said requesting application; and in response to said determining step, issuing said request to said network utilizing a request Q_Key generated by said request.

18. The computer program product of claim 16, wherein said setting of said control bit is completed during a context setup for said resource, said program product further comprising program instructions for:

determining that said control bit is set to said second value during generation of said request by said requesting application; and in response to said determining step, issuing said request utilizing only a Q_Key created during said context setup.

19. The computer program product of claim 18, wherein said providing instructions includes program instructions for preventing a non-privileged operation from modifying said Q_Key when said control bit is set to said second value, wherein a privileged operation includes an operation by said an operating system (OS) and an operation by a pre-determined set of processes.

20. The computer program product of claim 19, further comprising program instructions for issuing said Q_Key along with a request of said requesting application out to said network.

21. The computer program product of claim 7, further comprising program instructions for:

comparing said Q_key with a resource Q_key of one of said resources; and when said Q_Key matches said resource Q_Key, providing said requesting application with access to said resource.

22. The computer program product of claim 15, wherein said generating program instructions includes program instructions for appending said control bit to a Q_key of said application process context.

* * * * *